Feb. 14, 1933.   K. SIEG   1,897,867
CUT-OFF MECHANISM
Filed Aug. 29, 1931   7 Sheets-Sheet 1
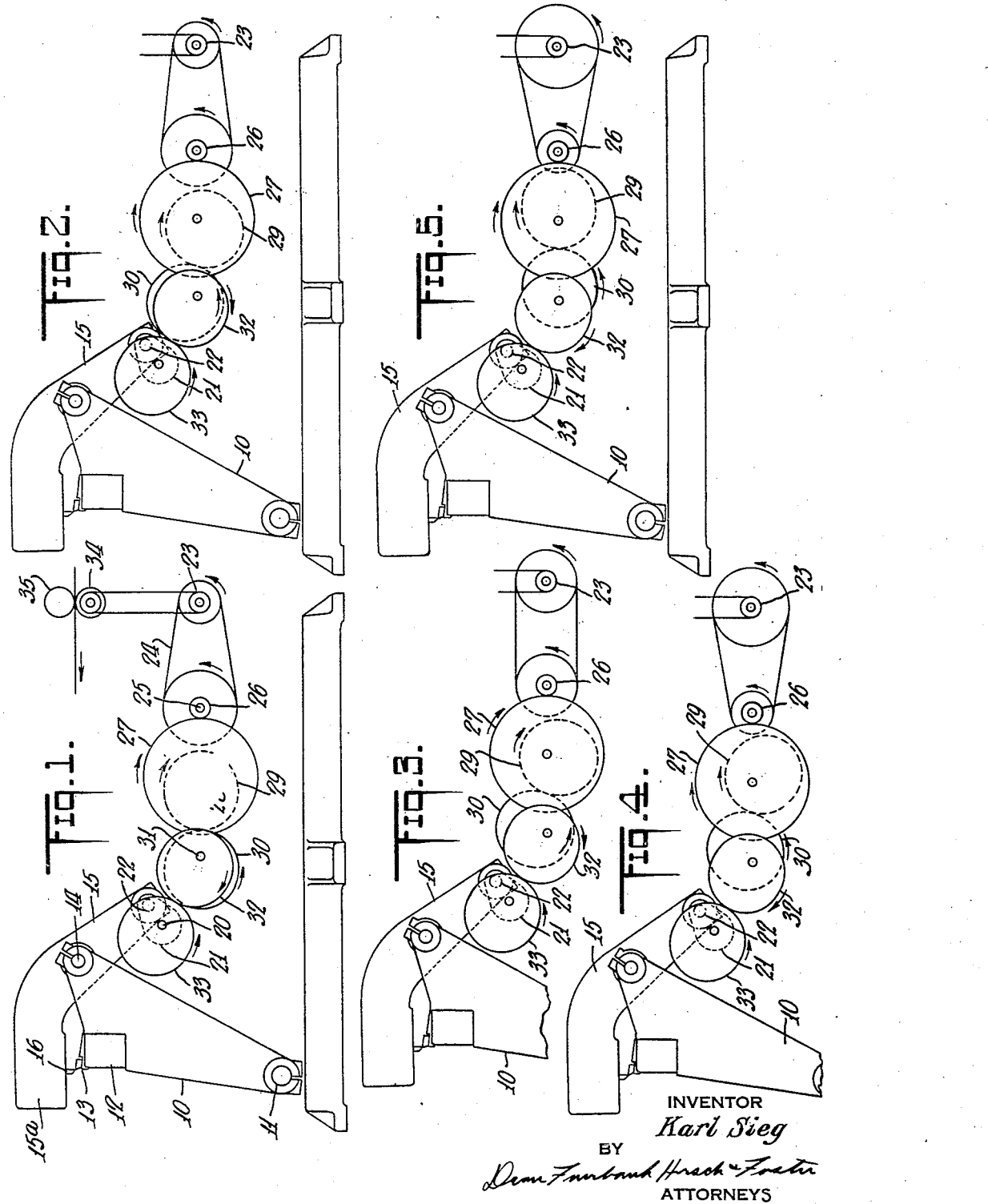
INVENTOR
*Karl Sieg*
BY
*Dean Fairbank Hirsch & Foster*
ATTORNEYS

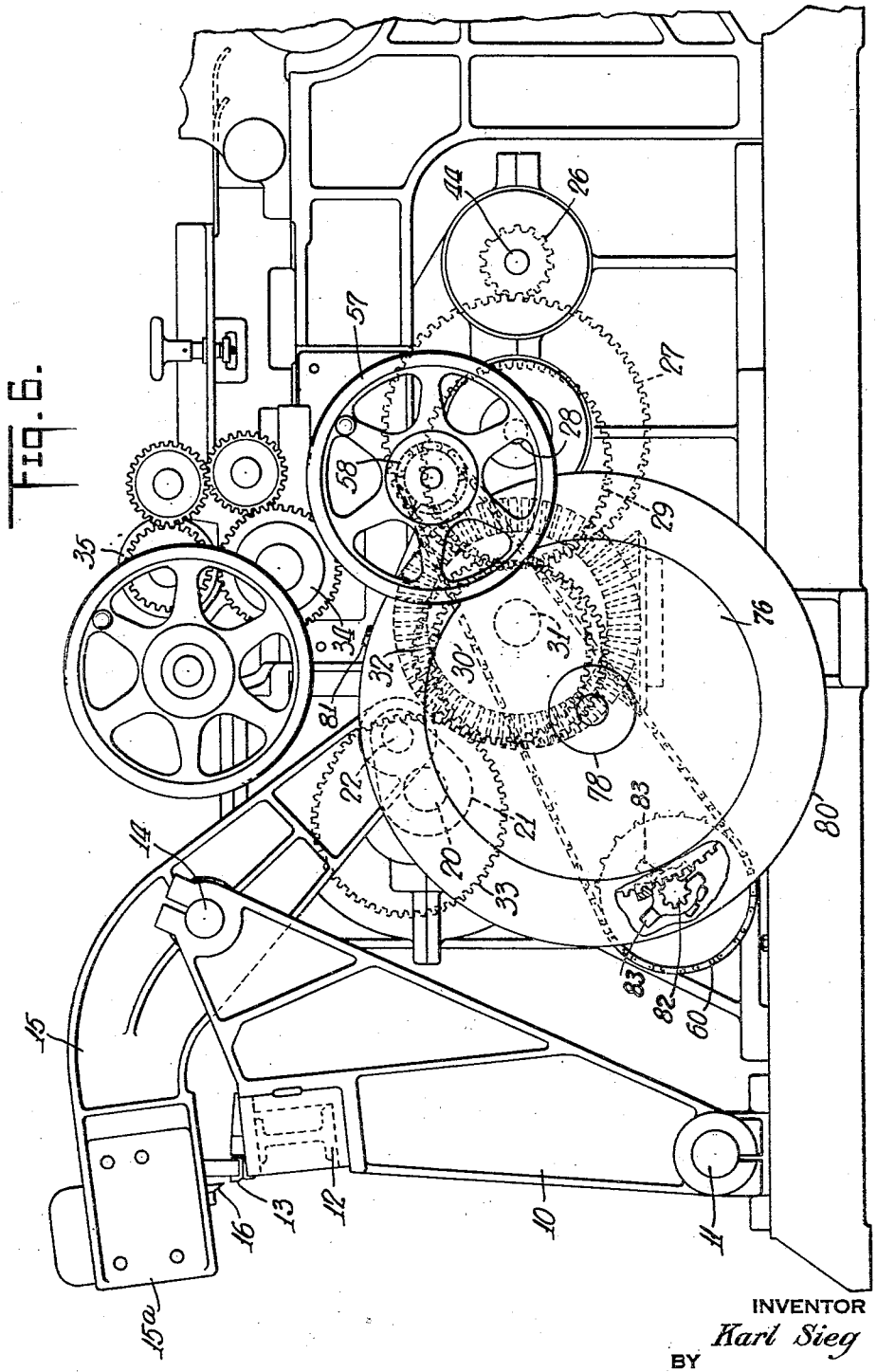

Feb. 14, 1933.　　　K. SIEG　　　1,897,867
CUT-OFF MECHANISM
Filed Aug. 29, 1931　　　7 Sheets-Sheet 4

INVENTOR
*Karl Sieg*
BY
ATTORNEYS

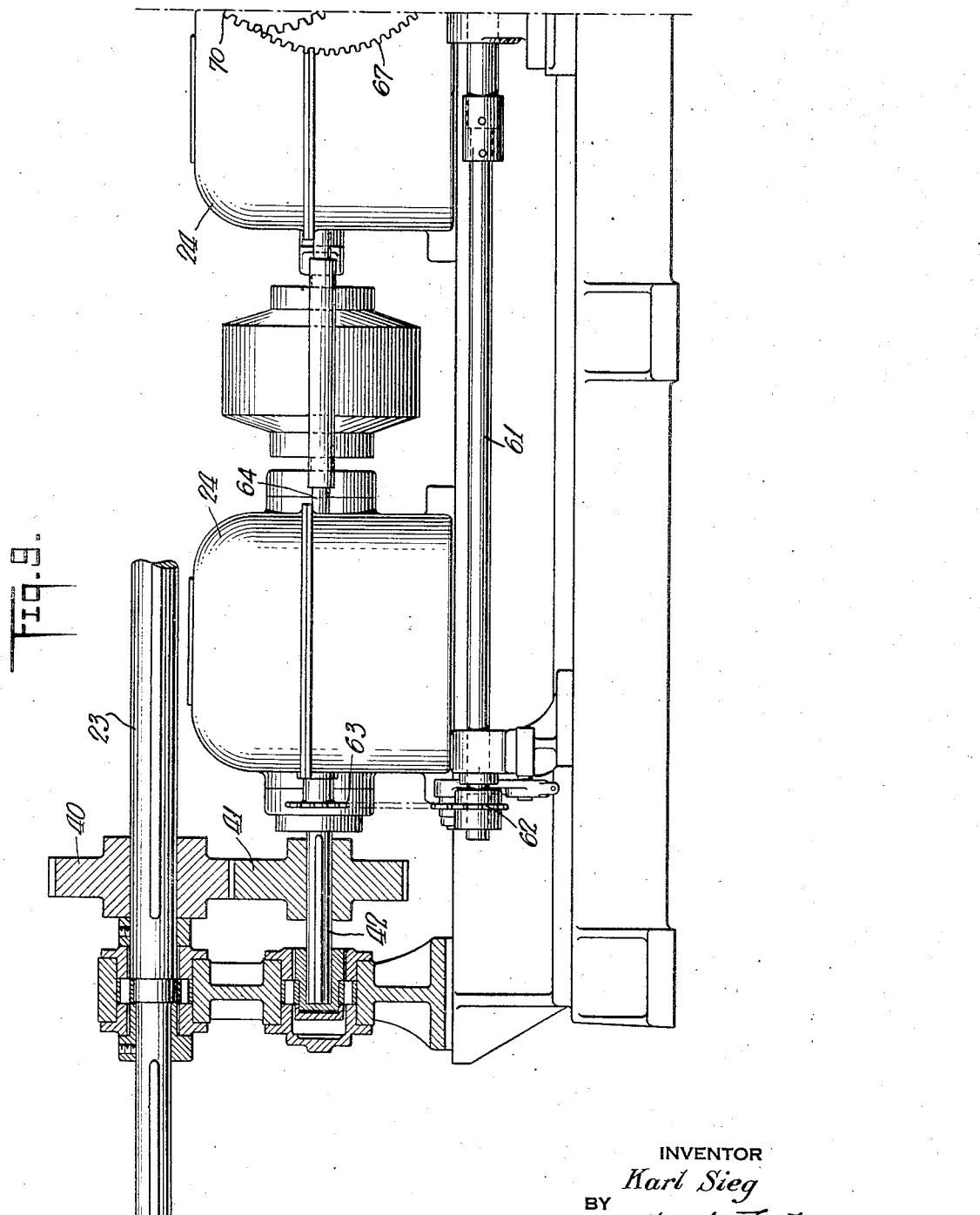

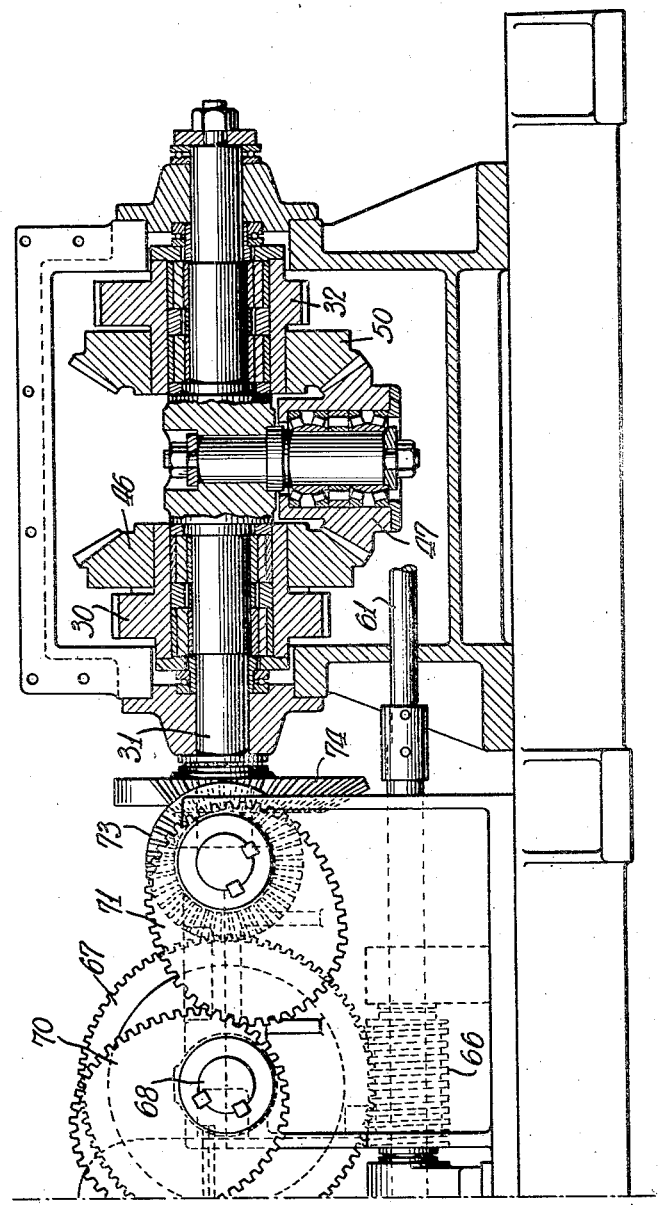

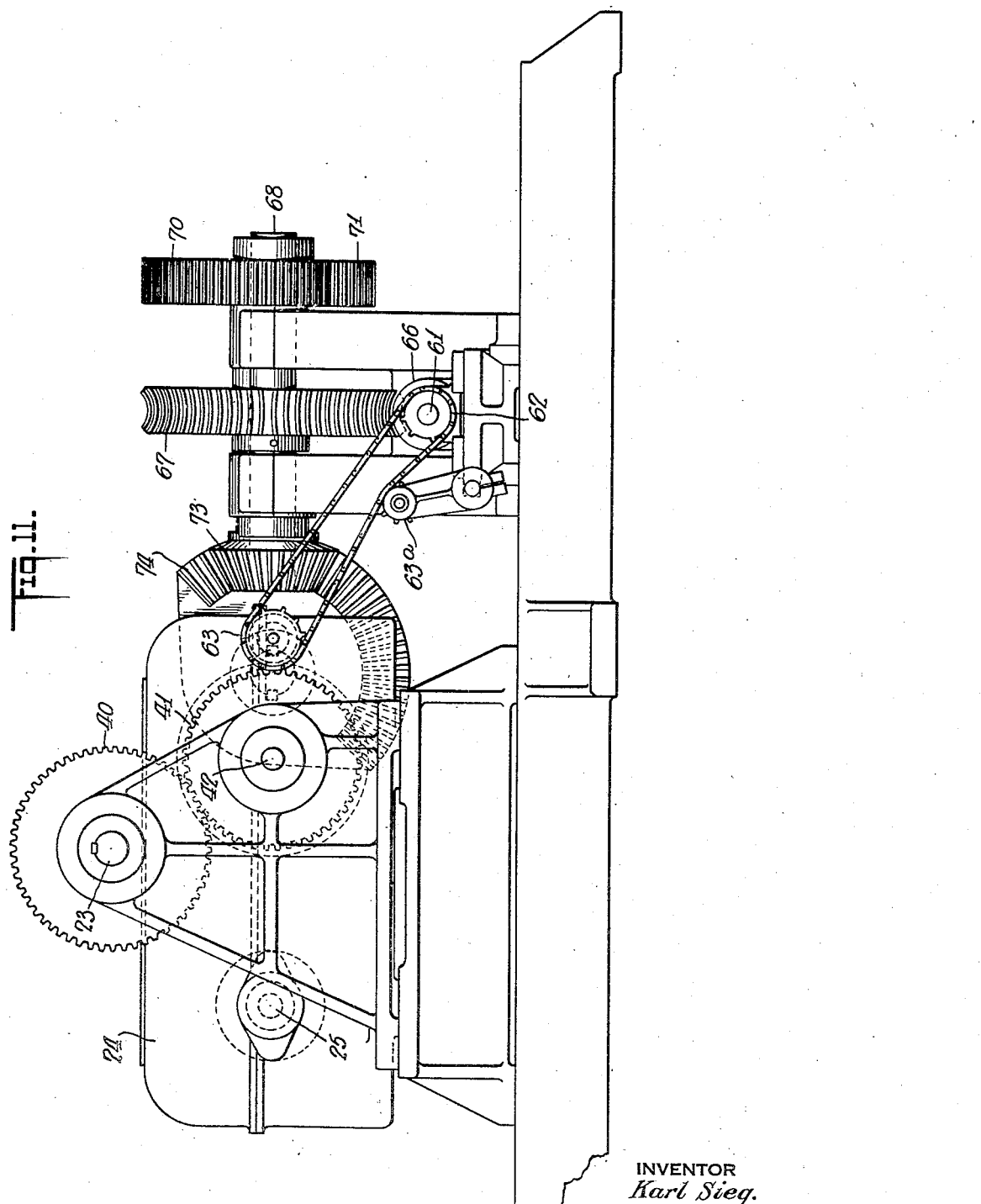

Patented Feb. 14, 1933                                    1,897,867

UNITED STATES PATENT OFFICE

KARL SIEG, OF PHILADELPHIA, PENNSYLVANIA, ASSIGNOR TO SAMUEL M. LANGSTON CO., OF CAMDEN, NEW JERSEY, A CORPORATION OF NEW JERSEY

CUT-OFF MECHANISM

Application filed August 29, 1931. Serial No. 560,125.

The present invention relates to machines for cutting into sections, continuously delivered sheet material, and more particularly to the controlling and driving mechanism for that type of cut-off mechanism in which the knives are in continuous movement, and in the act of cutting, come together and then separate while traveling with the material.

For cutting comparatively stiff material, such as double faced corrugated board, it is important that the rate of travel of the cutting knives in the general direction of movement of the material at the time of cutting action, be substantially the same as the rate of travel of the material. If the knives travel at a much slower rate than that at which the material is being supplied to the cut-off, said material will be retarded or forced to buckle, while if the knives travel at a much faster rate than the material, there is a tendency to pull the material along, or tear it, and prevent the forming of a clean cut.

It has been proposed to use adjustable elliptic gears to so vary the speed in the cycle of operation of the cutting knives, that at the time of cutting, the knives will travel at the same speed as the traveling material.

It has also been proposed to vary the lengths of the sections being cut without varying the feeding of the sheet material, by varying the total time of the cycle of movement of the cut-off mechanism in accordance with the desired length of the sections. Each such change in the total time period of the cycle of the cutter changes the speed at the time of cutting and requires readjustment of the relative rates of speed in the different parts of the cycles of the cutter, so as to again make the speed of the cutting knives at the time of cutting action, correspond to the speed of the material.

The making of one adjustment to accurately correspond with the extent of the other adjustment, and secure a travel of the cutter at the same speed as the sheet, regardless of faster or slower time for the complete cycle to get shorter or longer sections, is difficult to accomplish, time consuming and subject to considerable inaccuracy.

The main object of the present invention is to provide improved mechanism for securing a travel of the knife at the same speed as the sheet, even though the time period of the cycle of movement of the knife be varied to cut longer or shorter sections from a sheet traveling at any given speed.

A further object is to provide for both the adjustment of the total cycle time, and the adjustment of the relative rates of speed in the cycle, and make one of the adjustments automatically upon making the other.

A further object is to provide means whereby the adjustment of the relative rates of speed in the cycle may be made while the machine is running.

A further object is to secure an increase in range between the shortest and the longest sections which may be cut from a continuously advancing sheet, and by means of a continuously running cutter.

In carrying out the invention, there is employed as one feature thereof, two sets of elliptical gears operating in series, and a further object of the invention is to permit of the adjustment of one pair in respect to the other, so that their effects may be additive, or one may counteract the effect of the other.

Separate mechanisms are employed for making the adjustment of the total cycle time, and the adjustment of the relative rates of speed in the cycle, and a further object is to provide compensating means for automatically varying the extent of one adjustment to produce the proper effect when the other adjustment is made to any desired extent.

A further object is to provide a simple operating mechanism for effecting both adjustments simultaneously, and which may be calibrated to show the length of sections being cut with the parts in any particular adjustment.

Various other objects, advantages, and important features will be pointed out hereinafter, or will be apparent from a consideration of the specific construction illustrated in the accompanying drawings, and which constitute only one of many possible embodiments of the invention hereinafter claimed.

In these drawings:

Figs. 1–5 inclusive, are diagrammatic views showing various relative positions of the elliptic gears and the variable speed drive for cutting different lengths of sheet, Fig. 1, for instance, showing their approximate relative position for cutting a sheet into sections 72 inches in length; Fig. 2, 60 inches in length; Fig. 3, 36 inches in length; Fig. 4, 21.6 inches in length; and Fig. 5, 18 inches in length.

Fig. 6 is a side elevation of the machine.

Figure 7:
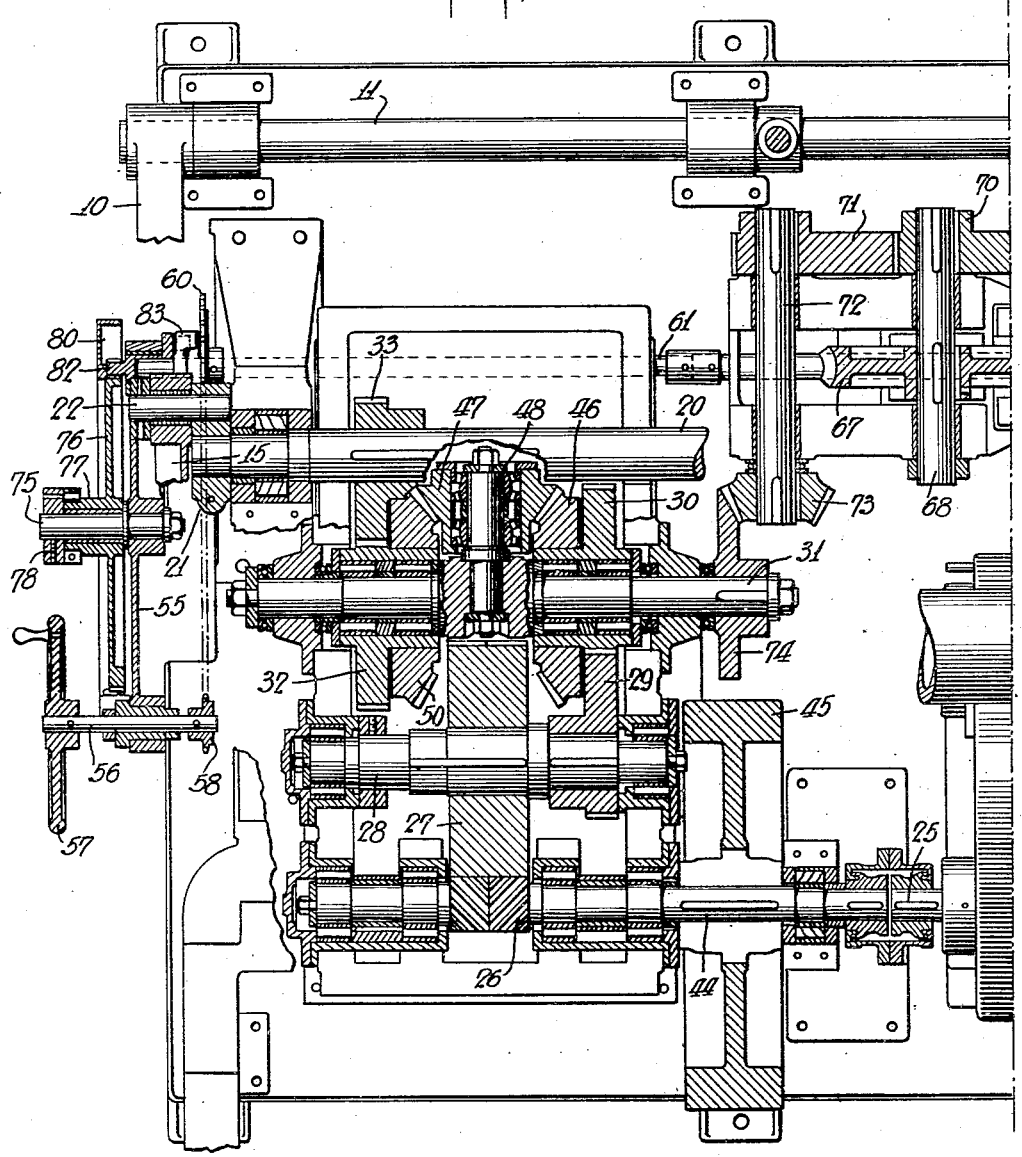
Figs. 7 and 8 are horizontal sections showing successive portions of the machine, the dot and dash line at the right of Fig. 7 and to the left of Fig. 8 indicating the line of severance between the two figures.
Figure 8:
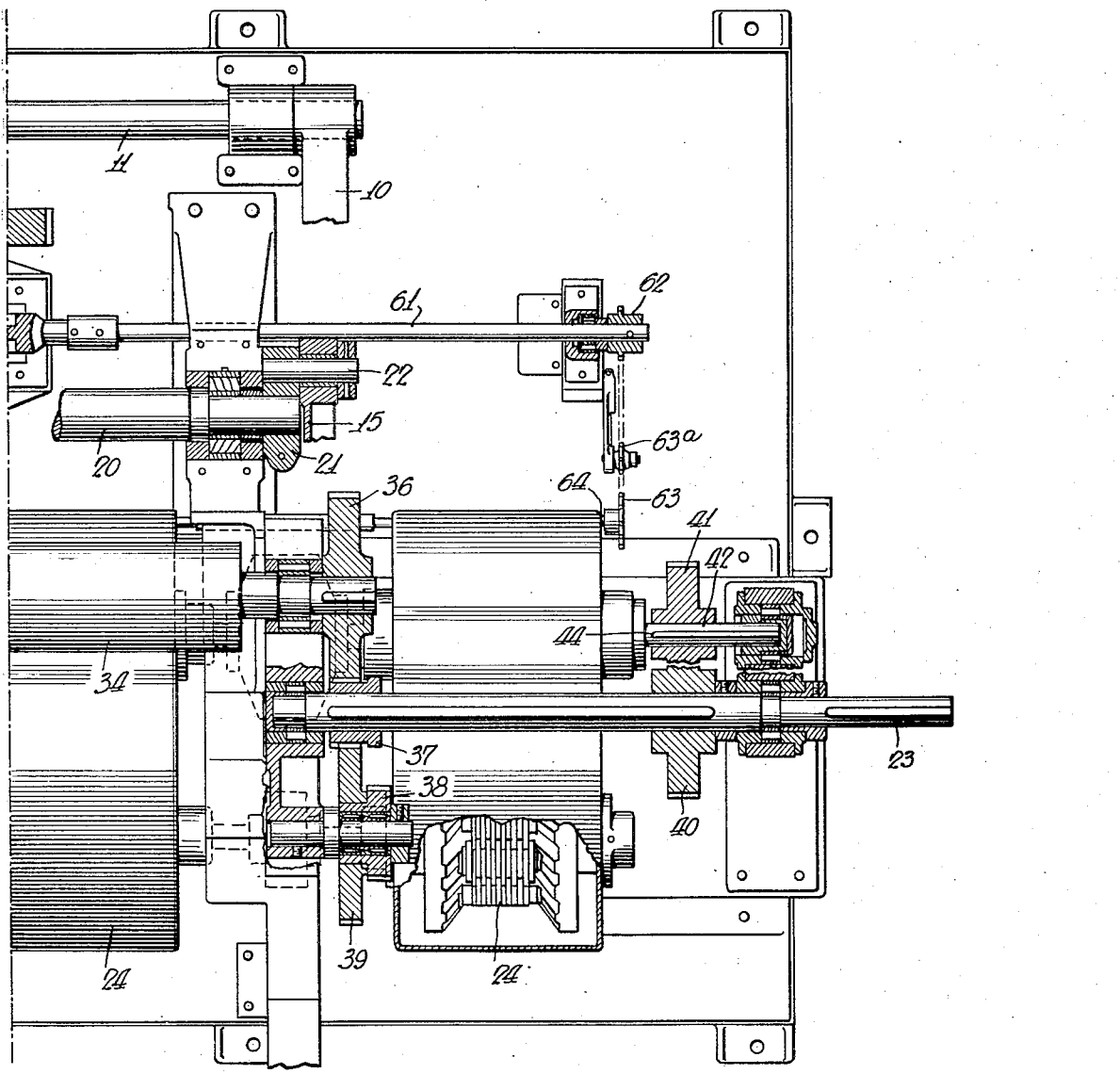

Figs. 9 and 10 are vertical, longitudinal sections of part of the machine, looking down from the upper sides of Figs. 7 and 8, and showing the differential gear arrangement for varying the timing of the cycle of operation of the cut-off, and also showing the variable speed transmission for varying the frequency of the cycle of operation of the cut-off mechanism, the two figures showing successive portions of the machine, the dot and dash lines at the right of Fig. 9, and at the left of Fig. 10 indicating the line of severance between the two figures, and Fig. 11 is a side elevation looking toward the left from the right-hand side of Fig. 8.

The cut-off mechanism in connection with which the present invention is illustrated is an embodiment of the invention disclosed and claimed in the Langston Patent 1,359,076, and includes a pair of upstanding arms 10 pivoted at opposite sides of the machine on a transverse rock shaft or pair of pivot pins 11, and at their upper ends are connected by a transverse beam 12 which carries the lower knife or cutting member 13. Each arm 10 carries a pivot pin 14 on which is mounted a lever 15, the two levers at their upper front ends carrying a transverse beam 15a on which is mounted the upper knife or cutter 16. The arms 10 extend substantially vertically, so that the knife 13 swings back and forth substantially horizontally, and approximately in the path of travel of the sheet.

The knives 13 and 16 are approximately the same distance from the pivot pins 14, so that as the levers 15 are operated, the knife 16 moves up and down, and in its lower operating position, it moves slightly below the knife 13 so as to cooperate with the latter and give a shearing cut. For driving the knives and their carrying members, there is provided a transverse shaft 20 having cranks 21 at opposite ends thereof, these cranks having crank pins 22 which are mounted in the ends of the levers 15. Thus, as the shaft 20 is rotated, the lower rear ends of the levers 15 are caused to travel in a circular path and the front upper knife 16 travels in a substantially elliptical path. As the members which carry the two knives are connected to the pins 14, it will be apparent that the rotation of the cranks imparts a back and forth movement of the knife 13 into the direction of travel of the sheet, which is accompanied by a corresponding back and forth movement as well as a vertical movement of the knife 16.

The type of cut-off mechanism above described is known as a traveling cut-off or flying shears, but it must be understood that as far as the broad aspects of the invention are concerned, the cut-off mechanism may be of any suitable type in which the knives travel in the direction of travel of the sheet at the instant of cutting.

The drive for the cutters, as well as certain different adjusted positions of parts thereof, is shown diagrammatically in various adjusted positions in Figs. 1 to 5.

The shaft 20 is driven from a drive shaft 23 through a variable speed transmission 24 having an output shaft 25 carrying a gear 26 meshing with a gear 27 secured to a shaft 28. Fixed on the shaft 28 is an elliptic gear 29 meshing with an elliptic gear 30 rotatably adjustable on a shaft 31. The shaft 31 also carries an elliptic gear 32 which meshes with an elliptic gear 33 mounted on the crank shaft 20 of the cutter. A drive connection is provided between the two pairs of elliptic gears, and includes a differential gear arrangement, more fully described hereinafter. The elliptic gears 32 and 33 would serve to drive the cut-off mechanism at a speed varying at different points in the cycle of movement of said cut-off, if the shaft 31 were driven at uniform speed as set forth in the Langston Patent No. 1,489,135, and the Langston and Sieg Patent No. 1,660,844. By the adjustment of one pair of elliptic gears, the speed of the cutting knives at the instant of cutting, may be made the same as the speed of the traveling sheet material. One pair of elliptic gears is fixed in respect to the drive shaft 44 and adjustable in respect to the cutter, while the other pair is fixed in respect to the cutter and is adjustable in respect to the drive shaft 44. Two sets of elliptic gears are shown although so far as certain aspects of the invention are concerned, one pair may be omitted or replaced by ordinary circular gears.

It is seen that when it is desired to shorten the length of the sheets being cut with the parts shown in Fig. 1, the variable speed transmission 24 is varied so as to increase the speed of the shaft 28. This causes the corresponding increase in frequency of the crank 21. At the same time, to adjust the timing in the cycle of the cutting knives to maintain the speed of these knives the same as that of the sheet during cutting action, the position of the pair of elliptic gears 29 and 30 with respect to the pair of elliptic gears 32 and 33, is changed as shown in Figs. 1–5. The elliptic gears are so proportioned and so adjusted that irrespective of the speed of the shaft 23, the cutting knives during cutting action will travel at the same speed as the paper.

It will be noted that in Fig. 1, the parts will cut the longest section. The shaft 25 will rotate at one-half the speed of the shaft 23, and when the longest side of the gear 29 meshes with the short side of the gear 30, the long side of the gear 32 will mesh with the short side of the gear 33, and the knife will make a fast cut and slow return. With this adjustment and with the elliptic gears having their long radius twice the length of the short radius, the machine may be designed to cut a section seventy-two inches long, for example.

In the opposite extreme of adjustment shown in Fig. 5. the shaft 25 will rotate at twice the speed of the shaft 23, and with the knives in cutting position, the short side of the gear 29 meshes with the long side of the gear 30, while the long side of the gear 32 meshes with the short side of the gear 33. The knife will have the same rate of cutting speed as in Fig. 1, but will make its complete cycle in one-fourth the time that it takes in Fig. 1. Thus, sections of one-fourth the length or eighteen inches may be cut.

In both limits as well as in all intermediate positions such as shown in Figs. 2, 3 and 4, the length of the section is secured by adjusting the variable speed transmission, and the knives are given a cutting speed the same as that of the sheet, irrespective of the total time for a cycle of movement of the knives. It will be understood that the sheet is fed at a speed which may be constant, or may vary from time to time with variation in the speed of the shaft 23. In Figs. 1 to 5, there is shown diagrammatically, feed rollers 34 and 35 driven from the shaft 23, but this is merely to indicate that their speeds are directly proportional.

The reference characters used on these diagrammatic views are the same as used on the corresponding parts shown in Figs. 6 to 11 inclusive.

In the specific embodiment of the present invention, illustrated more in detail, the sheet feeding mechanism comprises a pair of feed rollers 34 and 35, the lower feed roller 34 being provided with a gear 36 meshing with a gear 37 (Fig. 8) secured to the drive shaft 23. This feeding mechanism may be continuously operated from the drive shaft 23, or the same source of power as that of the shaft 23 by any other suitable means. A machine of this type often has slitting or trimming cutters, and if such be provided, they may be driven from the gear 37 through gears 38 and 39.

For varying the speed of rotation of the shaft 25 in respect to the speed of the drive shaft 23, there is provided a suitable variable speed transmission 24. Two of these variable speed transmissions are employed in parallel, so as to economize in space, and permit the full power transmission with small units, but obviously a single but larger unit might be used. As illustrated (Fig. 8), the drive shaft 23 carries a gear 40 which meshes with a gear 41 secured to an input shaft 42 of both units of the variable speed transmission 24. This variable speed transmission is shown as an ordinary type in which two pairs of opposed conical discs are provided with a belt therebetween for transmitting power, the effective diameter of each pair of discs being altered by moving the discs of one pair toward each other, and the other pair apart to change the speed ratio. On changing the speed, the belt rises between one pair of discs and descends between the other, so that while the input shaft turns at constant speed, the output shaft is adjustable to the desired revolutions per minute. To prevent slippage, the belts are provided with teeth or lugs engaging in radial grooves of the discs. The details of these units are not shown as they may be of any standard design, such as that known in the trade as a P. I. V. gear.

The output shaft 25 of both units of the variable speed transmission is coupled to a shaft 44 which carries a fly wheel 45 (Fig. 7), and a herring-bone gear 26 meshing with a large herring-bone gear 27 secured to the shaft 28. The shaft 28 has fixedly connected thereto the elliptic gear 29 which meshes with the elliptic gear 30 loosely mounted on, and relatively rotatable in respect to the shaft 31. The elliptic gear 30 drives an elliptic gear 32 coaxial therewith, and also on and relatively rotatable in respect to the shaft 31, by means of a differential gearing. By the term "differential gearing" I mean a gearing which connects two coaxial parts (in the present case, the gears 30 and 32) so that the two rotate at fixed relative speeds, but which gearing may be operated at will to angularly advance or retard one in respect to the other. In the form shown, this differential gearing includes a bevel gear 46 connected to the elliptic gear 30, a bevel gear 47 carried on a stud 48 secured to the shaft 31, and a bevel gear 50 connected to the elliptic gear 32. By bodily moving the gear 47, one of the gears 46, 50 is rotatably adjusted in respect to the other. This elliptic gear 32 meshes with the elliptic gear 33 fixed to the crank shaft 20 of the cut-off mechanism. The crank shaft 20 has on the ends thereof a pair of cranks 21 carrying the crank pins 22 connected to the lower ends of the levers 15.

In order to change the frequency of the cutting knives so as to selectively vary the lengths of the sections without changing the speed of the material, a control mechanism is provided which includes a bracket 55 supporting a spindle 56 carrying a hand wheel 57 at one end thereof, and a sprocket wheel 58 at the other end (Fig. 7). Through a chain, this sprocket wheel 58 drives a sprocket wheel 60 connected to a control shaft 61, and said shaft carries a sprocket wheel 62 (Fig. 8) which serves to drive a sprocket wheel 63 on the ratio controlling shaft 64 of the variable speed transmission 24. Said chain may be engaged by an idler wheel 63a. The rotation of this shaft 64 causes the changes in the spacing of the discs of the variable speed transmission and to change the speed of the output shaft 25. It is seen that by turning the hand wheel 57, the frequency of the operation of the knives of the cut-off mechanism is adjusted.

In order to change the positions of the pair of elliptic gears 29 and 30 with respect to the pair 32 and 33 so as to maintain the speed of the cutting knives in the direction of travel of the sheet, substantially the same as that of the sheet, and constant in respect to the speed of the driving shaft 23 during their cutting action, the gears 30 and 32 are given a relative rotation by means of the differential gearing. The shaft 61 carries a worm 66 meshing with a worm wheel 67 (Figs. 7 and 10) secured to a shaft 68 which also carries a cam gear 70 meshing with a cam gear 71 connected to a shaft 72. This shaft 72 also has secured thereto a bevel gear 73 meshing with a segmental bevel gear 74 mounted at one end of the shaft 31.

The rotation of the shaft 61 through the manipulation of the hand wheel 57 causes the corresponding rotation of the shaft 31 through the worm 66, worm wheel 67, cam gears 70 and 71, and the gears 73 and 74. The rotation of this shaft 31 causes the corresponding rotation of the stud 48 about the axis of the shaft 31, and the movement of the bevel gear 47 about said axis. This movement of the bevel differential pinion 47 causes a relative rotation of the pair of elliptic gears 30 and 32 and an adjustment of the pair of elliptic gears 29 and 30 with respect to the pair of elliptic gears 32 and 33. This variation in the position between the two pairs of elliptic gears does not change the total speed of the cycle of movement of the cutting knives, but changes the relative rates of the cutting and return portions of the cycle, and permits the cutting speed to remain the same as the sheet speed for any given speed of the drive shaft 23 and the feed rolls 34 and 35 during the changes in frequency of operation of these knives to cut shorter or longer sections.

The rotation of the elliptic gear 30 tends to bodily carry along the bevel gear 47, and to rotate the shaft 31. Any such rotation of the shaft would, of course, change the adjustment of the relative positions of the elliptic gears 30 and 32. Such rotation is prevented by the irreversible gearing comprising the worm wheel 67 and the worm 66. Additional locking means may be provided, if desired, to normally positively prevent rotation of the shaft 31, except when it is desired to make an adjustment by means of the hand wheel 57.

The construction of the variable speed transmission 24 may be such that changes in speed ratio effected thereby are not proportional to the degree of rotation of the control shaft 64, and the changes in angularity of the pair of elliptic gears 30 and 32 may not be proportional to the change in speed variation. Since a single control member is provided for controlling the variable speed transmission and the adjustment of the elliptic gears, there is provided compensating means for effecting an angular adjustment of these elliptic gears to give the proper effect for each change in the speed ratio of the variable speed transmission. For that purpose, the pair of cam gears 70 and 71 of varying effective radii are provided between the shaft 61 and the shaft 31. These are of such shape and fixed setting as to secure the accurately determined setting of the driving elliptic gears, so that for any total cycle speed of the cutter, the cutting speed will remain constant in respect to the speed of travel of the sheet being cut into sections, as a given angular movement of the shaft 31 and its stud 48 will give twice as great a relative angular adjustment of the elliptic gears 30 and 32. As an adjustment of one elliptic gear through 180° in respect to the other elliptic gear, gives the maximum effective variation of the gears, it will be apparent that in my improved construction, it is not necessary to rotate the segmental gear 74 through more than 90° to secure adjustment through the total effective range.

In order that the operator may move the control hand wheel 57 to the proper extent to give any desired length of section, there is provided a calibrated indicating mechanism. The bracket 55 (Fig. 7) carries a fixed stud 75 on which is loosely mounted a dial gear 76 having a hub 77 which cooperates with the brake mechanism 78 by means of which the position of said dial gear may be set at any fixed point. Secured to said dial gear 76 is an indicating dial 80, the rim of which carries a series of section length graduations indicatively cooperating with a pointer 81 mounted on the frame structure of the machine. Meshing with the dial gear 76 is a pinion 82 which loosely engages one end of the shaft 61, and which is rotated by means of a dog arrangement 83 fixed to the shaft 61 and engaging said gear 82. By means of this arrangement any lost motion in the adjustment of the elliptic gears and variable speed drive are compensated for, the dial 80 not moving until this dog arrangement 83 has taken up the lost motion due to these gears and said drive.

Although one control means has been shown for adjusting both differential gearing and the variable speed transmission, it should be understood that as far as the broader aspects of the invention are concerned, two independent control means may be provided for these members, both control means being independently operated to obtain the desired adjustments.

Having thus described my invention, what I claim as new and desire to secure by Letters Patent is:—

1. An apparatus for subdividing continuously advancing sheet material transversely into sections, including a cut-off mechanism movable substantially in the same direction as the material at the instant of cutting, a manually operable control member, means responsive to the manipulation of said control member for varying the frequency of operation of the cut-off mechanism and determining the length of the sections, and means also responsive to the manipulation of said control member for adjusting the timing of the cycle of operation of said cut-off mechanism, so that the speed of said cut-off mechanism at the instant of cutting will be maintained substantially the same as that of the sheet for any given speed of the sheet and irrespective of the length of the sections into which the sheet is cut.

2. An apparatus for subdividing continuously advancing sheet material transversely into sections, including a cut-off mechanism having a movement at the instant of cutting substantially in the same direction as the path of movement of the material, means for varying the frequency of operation of said cut-off mechanism to vary the length of the sections being cut, and means operable while the machine is running for adjusting the relative speeds of the cut-off mechanism in its cycle, so as to maintain the traveling speed of the cut-off mechanism at the point of cutting operation substantially the same as the speed of sheet travel.

3. An apparatus for subdividing sheet material transversely into sections, including feeding means for continuously advancing the material, a cut-off mechanism movable in the path of movement of the material at the instant of cutting, a drive shaft, a drive connection between said drive shaft and said cut-off mechanism, including a variable speed transmission, and a pair of intermeshing elliptic gears having their cycles of operation coincident with that of the cut-off mechanism, and means for adjusting the cycle of operation of said intermeshing gears with respect to the drive shaft while maintaining the angular position of said gears constant with respect to the cut-off mechanism to maintain the speed of travel of the cut-off mechanism with the sheet at the instant of cutting, substantially the same as the speed of the sheet irrespective of any adjustments of said transmission.

4. In combination, sheet feeding mechanism, a cut-off mechanism, two pairs of intermeshing elliptic gears connected in series for driving said cut-off mechanism, means for varying the frequency of operation of the cut-off mechanism, and means for varying the angular position of one pair of elliptic gears with respect to the other pair.

5. In combination, a cut-off mechanism, and driving means therefor, including a pair of intermeshing elliptic gears, a variable speed transmission, and a differential gearing for angularly adjusting said elliptic gears in respect to the driving means.

6. In combination, feeding means for the material to be cut, a drive therefor, a cut-off mechanism movable at the instant of cutting in the direction of the path of movement of said material, means for operating said cut-off from said drive, and including a variable speed transmission, two pairs of intermeshing elliptic gears arranged in series, and a differential gearing for driving one pair from the other, and for adjusting the angular position of one set of gears with respect to the other.

7. In combination, a cut-off mechanism, a drive therefor, including a variable speed transmission, and a pair of intermeshing elliptic gears for driving said cut-off at a speed varying at different points in the cycle of movement, a control member, and means responsive to the manipulation of said control member for adjusting said transmission to vary the frequency of operation of the cut-off in accordance with the lengths of the sections to be cut, and for adjusting the cycle of operation of said intermeshing elliptic gears to maintain the speed of said cut-off mechanism constant at the point of cutting operation.

8. In combination, means for continuously feeding a web of material, a cut-off mechanism for subdividing the web transversely into sections during the feeding movement, a drive shaft, a driving connection between said drive shaft and said cut-off mechanism, and including a variable speed transmission for varying the frequency of operation of said cut-off mechanism in accordance with the lengths of the sections desired, a pair of intermeshing elliptic gears for driving said cut-off from said transmission at a speed varying at different points in the cycle of movement, a differential gearing for adjusting the cycle of operation of said intermeshing elliptic gears, a control member, and means responsive to the manipulation of said control member for adjusting said variable speed transmission, and for simultaneously operating the differential gearing to angularly adjust said intermeshing gears so as to maintain the speed of travel of the cut-off mechanism substantially the same as that of the material at the instant of cutting operation.

9. In combination, sheet feeding means, a cutter movable back and forth in the path of movement of the web, a drive therefor, two pairs of intermeshing elliptic gears, and a differential gearing between said pairs of elliptic gears to drive one pair by means of the other, and manually operable means for adjusting said differential gearing to angularly adjust the relative positions of the two pairs of gears.

10. In combination, a feeding mechanism for continuously delivering material to be cut into sections, a cutter movable in the path of movement of the sheet material at the instant of cutting, a drive shaft, a drive connection between said shaft and said cut-off mechanism, and including a variable speed transmission, a pair of intermeshing elliptic gears for driving said cutter at a speed varying at different points in the cycle of movement, and including a differential gearing in series with said elliptic gears, a control member for adjusting said transmission to vary the frequency of operation of the cut-off mechanism, and a drive connection between said control member and said differential gearing for adjusting said differential gearing, to vary the relative positions of the cutter in respect to the drive shaft, said last mentioned drive connection including a pair of intermeshing cam gears.

11. A cut-off mechanism including a crank shaft, a member mounted to move back and forth in the same direction substantially parallel to the direction of feeding of the material to be cut, a second member connecting the first mentioned member to the crank of said crank shaft, a pair of cooperating cutters carried by said members, a pair of elliptical gears for driving said crank shaft, and imparting to said knives a varying speed during their cycle of operation, means for varying the frequency of operation of said cutting knives, and a control member for angularly adjusting said elliptical gears in respect to said crank shaft.

12. A cut-off mechanism including a crank shaft, a member mounted to move back and forth in the same direction substantially parallel to the direction of feeding of the material to be cut, a second member connecting the first mentioned member to the crank of said crank shaft, a pair of cooperating cutters carried by said members, a pair of elliptical gears driving said crank shaft, and imparting to said knives varying speeds during their cycle of operation, and a manually operable control member for angularly adjusting said elliptical gears in respect to said crank shaft.

13. A cut-or mechanism including a drive shaft, a crank shaft, a member mounted to move back and forth in the same direction substantially parallel to the direction of feeding of the material to be cut, a second member connecting the first mentioned member to the crank of said crank shaft, a pair of cooperating cutters carried by said members, a pair of elliptical gears for driving said crank shaft from said drive shaft, and imparting to said knives a varying speed during their cycle of operation, means for varying the speed of rotation of the crank shaft in respect to the drive shaft to vary the frequency of operation of said cutting knives, and a differential gearing for angularly adjusting said elliptical gears in respect to said crank shaft.

14. A cut-off mechanism having a drive shaft, a pair of elliptical gears for driving said cut-off mechanism from said drive shaft, and means for angularly adjusting said gears in respect to the drive shaft while the cut-off mechanism is operating.

15. A cut-off mechanism having a pair of elliptical gears for driving the same, and a differential gearing for angularly adjusting said gears in respect to the cut-off mechanism.

16. In combination with a feeding mechanism for continuously delivering material to be cut into sections, a cut-off mechanism, two pairs of intermeshing elliptic gears in series for driving said cut-off mechanism at a speed varying at different points in the cycle of movement, and a driving connection between the two sets of elliptic gears, and including a pair of bevel gears, each connected for rotation with one elliptic gear of said pairs, and a third bevel gear meshing with said pair of bevel gears, and manually operable means for moving said third gear about the axes of said first mentioned bevel gears, for effecting changes in angular position between the two sets of elliptic gears.

17. In combination with a feeding mechanism, for continuously delivering material to be cut into sections, a cut-off mechanism, a normally stationary shaft, two pairs of intermeshing elliptic gears for driving said cut-off mechanism at a speed varying at different points in the cycle of movement, one gear of each pair being mounted on and rotatable with respect to said shaft, a driving connection between the two pairs of elliptic gears, and including a pair of bevel gears, one connected for rotation with each of the elliptic gears mounted on said shaft, a third bevel gear having a pivot secured to said shaft and rotatable about an axis transverse with respect to the axis of said shaft, said third bevel gear meshing with said first bevel gears, and means for rotating said shaft to move said third bevel gear bodily about the axis of said shaft to effect adjustments in the angular position between the two pairs of elliptic gears.

18. In combination, a cut-off mechanism, feeding mechanism for continuously delivering material to be cut into sections, two pairs of elliptic gears for driving said cut-off mechanism, a differential driving connection between the two sets of elliptic gears, a control member, and means responsive to the manipulation of said control member for varying the frequency of operation of the cut-off mechanism, and for operating said differential to adjust the relative positions between the two sets of elliptic gears.

19. In combination, feeding mechanism for continuously delivering material to be cut into sections, a cut-off mechanism movable in the direction of the path of movement of said material at the instant of cutting, a drive shaft, a driving connection between said shaft and said cut-off mechanism, and including a variable speed transmission, and a pair of intermeshing elliptic gears having their cycles of operation coincident with that of the cut-off mechanism to operate the cut-off mechanism at the same speed as the traveling material at the time of cutting, a control shaft, means responsive to the rotation of said control shaft for effecting adjustment of said transmission, and means operated by said control shaft, and including a pair of intermeshing cam gears for relatively adjusting said elliptic gears to adjust said cut-off mechanism in respect to said drive shaft.

20. In combination, feeding means for continuously advancing sheet material, a continuously operating cutter for subdividing the sheet transversely into sections, means for varying the total time cycle of said cutters to vary the length of the cut-off sections, and means for automatically varying the relative speeds of the cutters in their cycle to maintain the speed of said cutters at the instant of cutting substantially the same as that of the sheet, regardless of variations in the total time of the cycle.

21. In combination, means for feeding a continuous sheet of material at a substantially constant rate, a traveling cut-off, means for varying the total time cycle of the cut-off to vary the frequency of cutting operations and the length of the sections into which the sheet is cut, and means for simultaneously and automatically varying the speed of travel of the cut-off in its cycle to maintain the speed at the instant of cutting substantially the same as the speed of sheet travel, irrespective of the total time of the cycle of the cut-off.

22. In combination, means for feeding a continuous sheet of material, a traveling cut-off, means for varying the total time cycle of the cut-off to vary the frequency of cutting operations and the length of the sections into which the sheet is cut, means for varying the speed of travel of the cut-off in its cycle, and a manually operable control member for simultaneously operating both of said means to maintain the speed at the instant of cutting substantially the same as the speed of sheet travel, irrespective of the total time of the cycle of the cut-off.

23. In combination, a traveling cut-off, two pairs of elliptical gears in series for driving said cut-off, a differential gearing between said pairs for driving one from the other, a manually operable control shaft, and a pair of eccentric gears operated by said control shaft for bodily moving a gear wheel of said differential gearing to adjust one pair of elliptical gears in respect to the other pair.

24. In combination, a traveling cut-off, two pairs of elliptical gears in series for driving said cut-off, a differential gearing between said pairs for driving one from the other, a worm wheel for bodily moving a gear wheel of said differential gearing to angularly adjust one pair of elliptical gears in respect to the other, and a worm meshing with said worm wheel for rotating the latter, and serving to lock the worm wheel and differential gearing in angularly adjusted position.

25. In combination, a traveling cut-off, two pairs of elliptical gears in series for driving said cut-off, a differential gearing between said pairs for driving one from the other, and an irreversible gearing for bodily adjusting a gear wheel of said differential gearing and holding said gear wheel in adjusted position.

26. In combination a drive shaft, a traveling cut-off, a pair of elliptic gears for driving said cut-off from said drive shaft, a differential gearing in series with said elliptic gears, a worm wheel for bodily adjusting a gear wheel of said differential gearing to advance or retard said cut-off in respect to said drive shaft, and a worm meshing with said worm wheel for rotating the latter and serving to lock the worm wheel and differential gearing in angularly adjusted position.

27. In combination a traveling cut-off, a drive shaft, and power transmitting connections between said drive shaft and said cut-off including in series a variable speed transmission, a pair of elliptic gears, and a differential gearing connected to one of said gears, and means for operating said differential gearing to angularly adjust the cut-off in respect to the drive shaft.

28. In combination a drive shaft, a traveling cut-off, a pair of elliptic gears for driving said cut-off, a differential gearing connected to one of said gears, and irreversible gearing for bodily adjusting a gear wheel of said differential gearing to thereby adjust said cut-off in respect to said drive shaft, said irreversible gearing holding said gear wheel in adjusted position.

29. In combination with a feeding mechanism, for continuing delivering material to be cut into sections, a cut-off mechanism, a pair of intermeshing elliptic gears for driving said cut-off mechanism at a speed varying at different points in the cycle of movement, a driving connection between said elliptic gears and said cut-off mechanism, and including a pair of gears, one connected for rotation with one of the elliptic gears and the other connected for rotation with said cut-off mechanism, a third gear meshing with both of said pair of gears, and means for bodily moving said third gear about the axis of said pair of gears to effect adjustments in the angular position of said pair of elliptic gears in respect to said cut-off mechanism.

30. In combination with a feeding mechanism, for continuously delivering material to be cut into sections, a cut-off mechanism, a pair of intermeshing elliptic gears for driving said cut-off mechanism at a speed varying at different points in the cycle of movement, a driving connection between said elliptic gears and said cut-off mechanism, and including a pair of gears, one connected for rotation with one of the elliptic gears and the other connected for rotation with said cut-off mechanism, a third gear meshing with both of said pair of gears and having a normally stationary axis, and irreversible gearing for bodily moving said third gear and its axis about the axis of said pair of gears to effect adjustments in the angular position of said pair of elliptic gears in respect to said cut-off.

31. An apparatus for cutting a continuously delivered sheet transversely into sections, including feed mechanism for the sheet, a cutter movable in the direction of travel of the sheet at the instant of cutting, a drive shaft, connections between said drive shaft and said cutter including a variable speed transmission and a pair of elliptic gears, means for adjusting said variable speed transmission to vary the time cycle of the cutter in respect to the rate of travel of the sheet, means for adjusting the cutting speed of the cutter in its cycle to equal the speed of sheet travel, a control member, connections between said member and one of said means, and connections between said control member and the other of said means, one of said connection including cam members.

Signed at Camden in the county of Camden and State of New Jersey this 24th day of August. A. D. 1931.

KARL SIEG.